United States Patent [19]

Pender

[11] 4,024,309
[45] May 17, 1977

[54] FOAM GLASS STRUCTURAL ELEMENT AND METHOD OF PRODUCING

[75] Inventor: David R. Pender, Columbia, S.C.

[73] Assignee: Wilder Ronald P., Columbia, S.C.

[22] Filed: Mar. 17, 1975

[21] Appl. No.: 559,047

[52] U.S. Cl. .................................. 428/312; 65/3 B; 65/22; 65/32; 428/71; 428/313; 428/433; 156/79

[51] Int. Cl.² .......................................... B32B 3/26

[58] Field of Search ............. 428/69, 71, 312, 313, 428/310, 322, 320, 321, 432, 433, 434, 68, 70; 156/79, 78; 65/20, 22, 3 B, 32

[56] References Cited

UNITED STATES PATENTS

| | | | |
|---|---|---|---|
| 1,748,587 | 2/1930 | Smedley | 428/322 |
| 2,620,597 | 12/1952 | Ford | 65/22 |
| 3,300,289 | 1/1967 | Long | 65/22 |
| 3,922,414 | 11/1975 | Oshima et al. | 156/79 |

Primary Examiner—William J. Van Balen
Attorney, Agent, or Firm—B. P. Fishburne, Jr.

[57] ABSTRACT

Foam glass developed under vacuum is continuously formed into a slab while being cladded on its major sides and longitudinal edges with sheet metal. The metal claddings or facings for the two major sides of the slab are held under tension during the solidifying of the slab body. End plates are inserted transversely through the product at specified points during its movement and sections of the continuous product are cut to length, whereby the sections are prestressed partly as a result of compression along two axes caused by differing coefficients of expansion of the cladding and foam glass body and partly to atmospheric compression of the product on a third axis perpendicular to its major sides. Modified forms of the product eliminate the metal cladding or skin entirely or provide the same as a cast-on coating without mechanical prestressing.

6 Claims, 8 Drawing Figures

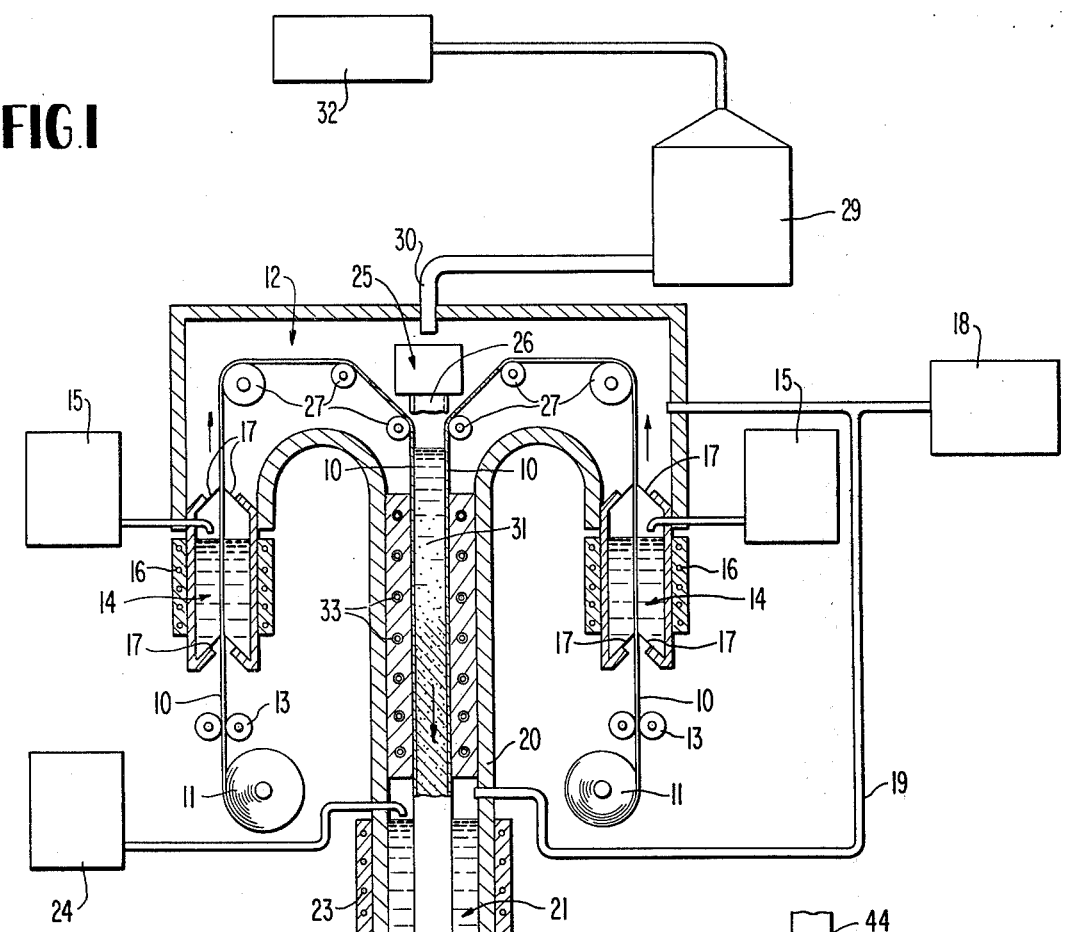
FIG.1
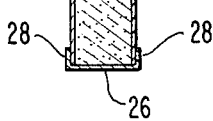
FIG.2
FIG.3

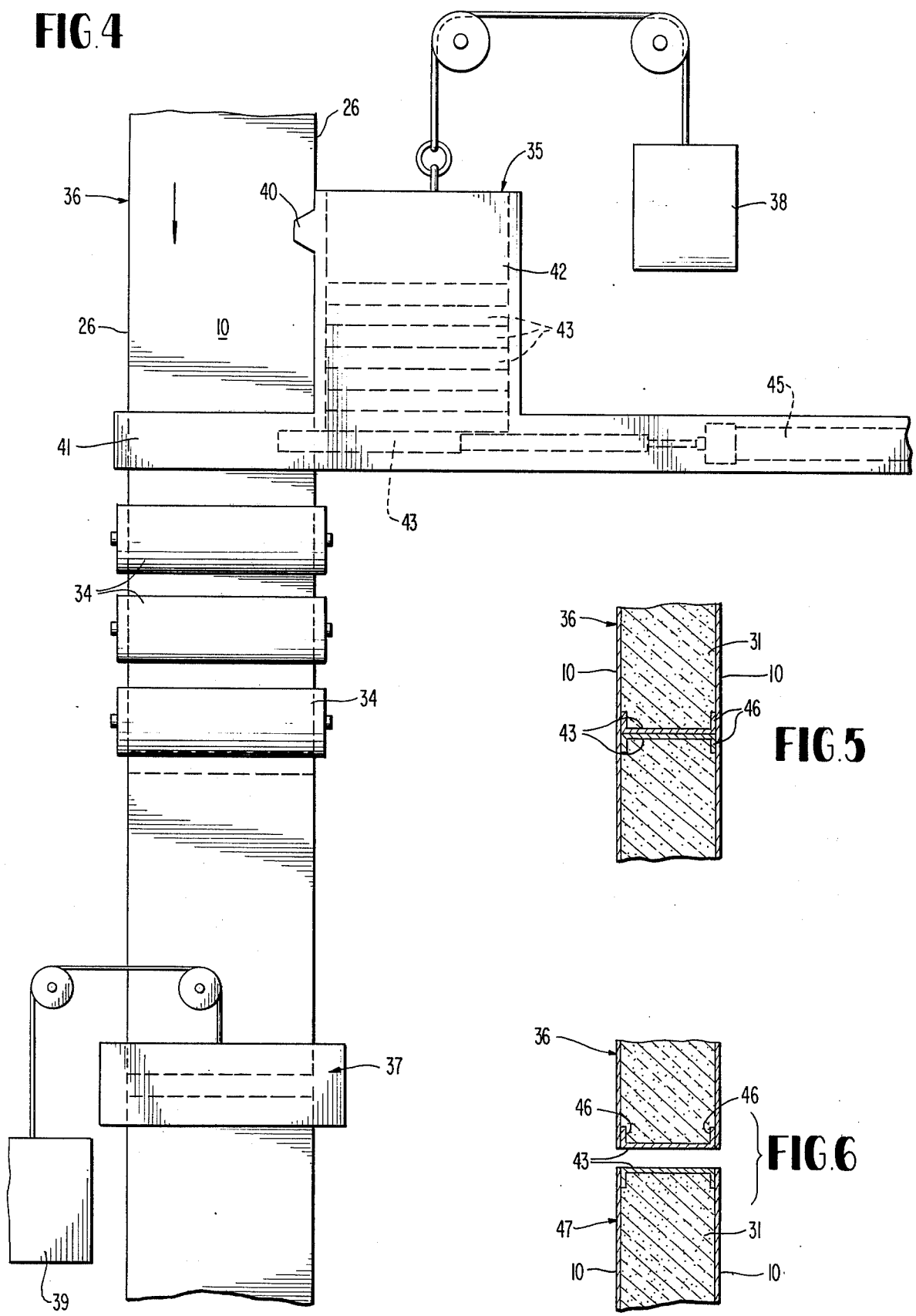

FOAM GLASS STRUCTURAL ELEMENT AND METHOD OF PRODUCING

BACKGROUND OF THE INVENTION

The invention arises as a result of a need for less expensive lighter weight structural materials, such as panels, which require a reduced expenditure of energy to produce, transport and erect into usable structures. More particularly, the invention is looked to as a successful alternative to prestressed or reinforced concrete. The product of the invention is suitable for example for floors, walls, ceilings and even for roofs of buildings.

In its preferred form, the product has a core or slab body of vacuum glass foam completely encased in an exterior skin or cladding of high tensile strength sheet material, such as steel. The claddings on at least the two major area surfaces of the product are applied thereto in a stretched condition and after severing of the product into usage panel lengths, the contraction of the stretched claddings or facings will compress the product along two axes, longitudinally and transversely. Along the third or thickness axis of the product, it will be compressed by the atmosphere acting normal to the major area surfaces thereof. As a consequence of this, the usable product sections are prestressed on their three dimensional axes so as to have the highest possible strength to weight ratio.

Additionally, the prestressing skin renders the panel sections of the product watertight and relatively damage-resistant and suitable for interior or exterior applications in buildings. Various decorative finishings or paints may be employed on the product.

The product has excellent thermal and sound insulation properties and good corrosion-resistance due in part to the nature of the materials themselves and in part to their processing under vacuum.

A major advantage of the product compared to internally prestressed concrete lies in the relatively fast settability of the foam glass in a continuous movement casting process which would not be practical for concrete.

The net energy requirement for the product is very favorable compared to competing materials. The comparably small weight of foam glass required per usable unit of the product should require much less energy to produce than a comparable amount of concrete. Much less steel is required in the cladding than in regular reinforced concrete with reduced energy needed for the production of the steel. In conventional prestressed concrete, most of the steel's strength is used up sustaining the heavy weight of the concrete and not the content of the building or in resisting the forces of nature, and this is not true with the more efficient product of the present invention.

Finally, much less energy is needed to transport, handle and erect building materials formed according to the invention in comparison to competing materials.

Other features and advantages of the invention will become apparent during the course of the following detailed description.

BRIEF DESCRIPTION OF DRAWING FIGURES

FIG. 1 is a partly schematic vertical cross sectional view of a processing plant for a prestressed foam glass construction element embodying the invention.

FIG. 2 is an enlarged horizontal cross section taken through the product on line 2—2 of FIG. 1.

FIG. 3 is a fragmentary edge elevational view of the product prior to end plate insertion and prior to severing into usable product lengths.

FIG. 4 is an enlarged fragmentary partly schematic elevational view of end plate inserter means and product severing means downstream from the inserter means and skin tensioning rollers.

FIG. 5 is an enlarged fragmentary cross sectional view of the product showing end plates inserted therein.

FIG. 6 is a similar cross sectional view after severing of the product between a pair of inserted end plates.

DETAILED DESCRIPTION OF PREFERRED EMBODIMENTS

Figure 7:
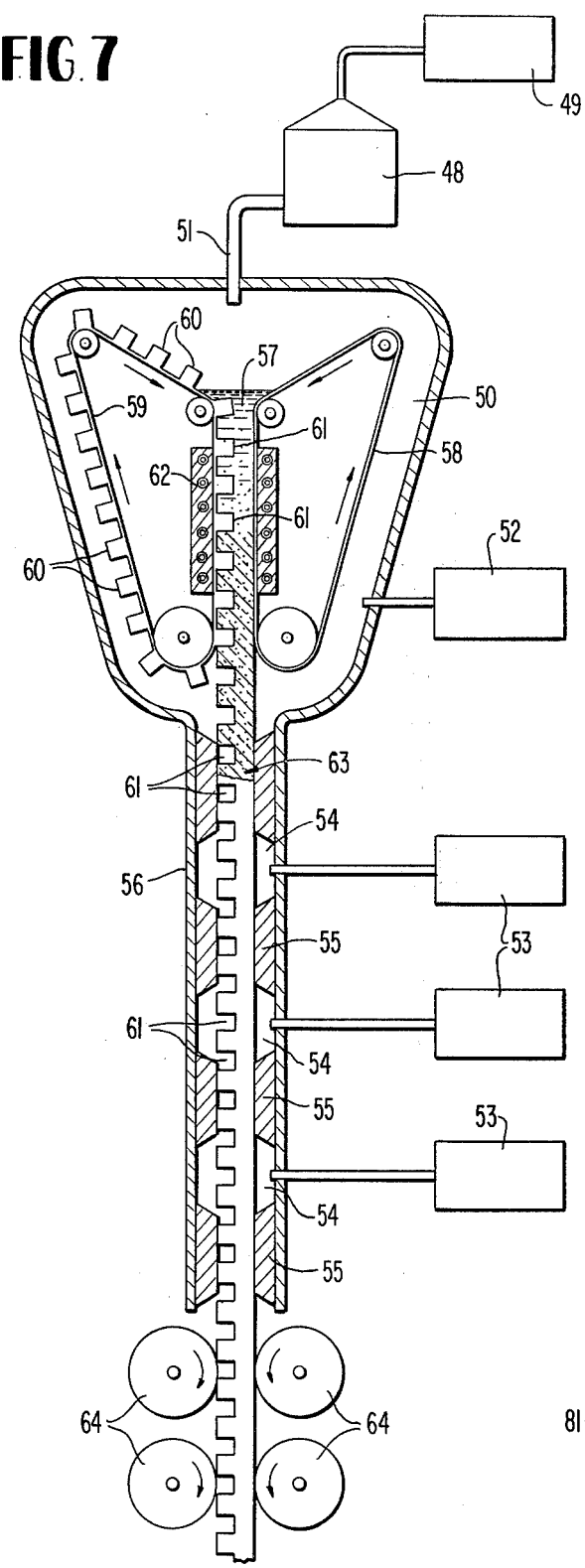
FIG. 7 is a schematic view similar to FIG. 1 of a modified form of processing plant for producing a modification of the structural product.

Referring to the drawings in detail wherein like numerals designate like parts, a preferred embodiment of the invention is shown in FIGS. 1 through 6.

In these figures, steel sheets 10 are fed from rolls 11 and into a high vacuum chamber 12 by speed regulating rollers 13. When entering the vacuum chamber, the two steel sheets 10 pass through molten metal vacuum seals 14 preferably containing molten aluminum supplied from adjacent aluminum melt furnaces 15. Suitable heating coils 16 surround the seals to maintain the metal in a molten form. Angled wiper blades 17 at the tops and bottoms of the molten aluminum seals continuously wipe and remove excess molten metal from the opposite faces of the steel sheets 10 passing through the seals. The seals are designed to prevent the loss of vacuum in the chamber 12 and also to prevent the loss or outflow of molten metal from the seals during the operation of the apparatus. The two molten aluminum seals 14 serve the additional purpose in the method of coating the steel sheets 10 on both sides with a corrosion-resistant film of aluminum, and a lack of oxygen in the vacuum system prevents the aluminum film from oxidizing.

A suitable suction pump 18, or a series of such pumps, maintains the required relatively high degree of vacuum in the chamber 12. A branch vacuum line 19 connected with the pump 18 maintains the same degree of vacuum in a central depending extension 20 of the chamber through which the product travels downwardly during its formation, as will be fully described. An outlet molten aluminum seal 21 is provided at the bottom of the chamber extension 20 to give a final aluminum film coating to the outer faces only of the product passing therethrough while maintaining the required vacuum in the processing chamber. Angled wiper blades 22 at the bottom of the seal 21 regulate the thickness of the aluminum coating. The molten aluminum seal 21 also has a heating coil 23, as shown. Another aluminum melt furnace 24 supplies the lower seal 21 with molten aluminum. The sets of wiper blades 17 and 22 are spring-tension blades which firmly engage the opposite sides of the webs or sheets 10 and the product, in the case of the blades 22.

Shown schematically in FIG. 1 is a means 25 for feeding and forming narrow steel webs or sheets 26 downwardly in unison with the movement of the wider sheets 10 after the latter have passed over suitable guide rollers 27 in the chamber 12. The means 25 may include molten aluminum seals, not shown, similar to the described seals 14 for coating the narrow sheets 26 on both sides as they enter the vacuum chamber. The means 25 is also capable of forming side flanges 28 on the narrow sheets 26 so that the wide and narrow steel sheets or claddings may be fed downwardly through the chamber extension 20 in assembled relationship as depicted in FIG. 2, which is a horizontal section through the product being formed.

The flanges 28 are preferably lapped over the outer faces of sheets 10 and secured thereto by spot welding, continuous welding, or other suitable fastening means. The construction thus formed is a hollow rectangular longitudinally continuous, laterally wide and relatively thin configuration, dimensioned for the production of structural panels when the product is subsequently cut into useful lengths.

As the paired sheets 10 and 26 are continuously fed downwardly in the vacuum chamber section 20, molten vacuum glass foam supplied from an external glass furnace 29 through a decompression nozzle 30 is fed into the hollow interior of the form being produced continuously from the sheets or webs 10 and 26. The vacuum glass foam designated by the numeral 31 completely fills the interior of the sheet metal form to produce with the exterior sheets, claddings or facings an integrally bonded lightweight high strength corrosion-resistant substantially sealed panel structure, as will be more fully described.

The production of foam glass, broadly speaking, is known in the prior art. In connection with the present invention, the molten glass from furnace means 29 is formulated with sufficient gas-producing chemicals, whereby when the glass is pressure released through the nozzle 30 into the vacuum chamber 12 gas will be released from the molten glass to form bubbles, and the prevailing vacuum will allow the bubbles to grow until their internal pressures match or balance with the very low external pressure in the vacuum chamber. This results in the production of the vacuum foam glass as that term is employed herein. The glass furnace 29 is preferably connected with a control pressure or vacuum source 32, such as a pump.

During the formation of the product in the chamber extension 20, when the bubbles in the foam glass have reached a maximum size, heat is removed from the molten glass by suitable cooling coils 33 in this region of the apparatus. It will be understood that the product is continuously moving. The cooling coils contact the metal exterior claddings or sheets 10 and 26 in order to rather quickly solidify the foam glass inside of the same. Also the expansion of the gas in the bubbles absorbs heat and hastens the solidifying process. During this process, the steel exterior sheets will be bonded to the foam glass core of the product. More particularly, the steel sheets 10 are bonded to the aluminum coating provided during passage through the seals 14. The hot molten glass foam will release oxygen and produce some aluminum oxide on the interior aluminum coatings of the sheet steel, and this aluminum oxide film will chemically bond the sheets to the foam glass core. If it is desired not to bond the steel sheets to the foam glass core in some instances, known release agents may be employed or the interior side aluminum films can be scraped off of the steel sheets prior to contact with the glass.

Following the described solidifying of the foam glass and the bonding thereof to the exterior metal sheets, the continuous moving rigid panel product now exits through the lower molten aluminum vacuum seal 21 and receives a final external corrosion-resisting coating, as described.

During all of the processing of the product thus far described, the major steel sheets 10 are under constant high tension longitudinally by the concerted action of plural prestressing powered tensioning rollers 34 below the vacuum extension chamber 20 and engaging the opposite major sides of the product. The previously-described speed regulating feed rollers 13 exert a braking effect on the webs or sheets 10 whereby all portions of the sheets between the sets of rollers 13 and 34 are stretched constantly and remain stretched or under high tension until the product is severed into usable lengths, as will be described.

In the region between the exit seal 21 and the prestressing rollers 34, a product end plate inserter and fastener means 35 shown diagrammatically in FIG. 1 and shown in somewhat greater detail in FIG. 4 is employed.

Referring to FIG. 4, the end plate inserter and fastener means 35 is constructed to move bodily with the continuously moving product 36 so that it may be elevated and locked onto the product at a given place where it is desired to cut the product subsequently into usable panel lengths. However, it should be noted that the means or unit 35 does not do the actual cutting of the product, and this is done subsequently by a separate means 37 at a lower elevation slightly downstream of the prestressing rollers 34.

Both of the means 35 and 37 may be counterbalanced as at 38 and 39 so that they can be raised or lowered and moved with the product 36 after locking onto the same.

The means 35 has guide lugs 40 near its upper end to straddle the product 36 and product gripping means 41 at its lower end for locking on to the moving product. A magazine body portion 42 of the means 35 contains back-to-back paired end channel plates 43 therein in stacked relation which are forced one pair at a time from the bottom of the magazine stack endwise into the foam glass core 31 of the product 36, at least the adjacent narrow steel plate 26 having openings 44, FIG. 3, provided therein to allow the insertion of the channel end plates 43. The pairs of end plates 43 are inserted by a suitable ram 45 forming a part of the means 35. The paired end plates are easily forced through the solidified foam glass core 31 which is a lightweight cellular mass having little resistance to penetration by a sharp or rigid object.

FIG. 5 shows a pair of the end plates 43 after insertion by the ram 45 through the openings 44 of the product sheets 26 and between the major side sheets 10. Following insertion, the flanges 46 of the channel end plates 43 are secured to the steel sheets 10 by spot welding, line welding, blind riveting or equivalent means. This fastening operation may be automatic or manual. Following insertion of a pair of end plates 43, the gripping means 41 releases the moving product 36 so that the counterweighted inserter assembly 35 may move upwardly relative thereto. At this time, the product 36 is still moving under influence of the tensioning or prestressing rollers 34 and has not been severed into usable lengths.

Next, the severing means 37 is brought into operation to sever the moving product cleanly between the back-to-back end plates 43. This separates one usable section 47 or panel section from the remainder of the oncoming continuous product 36, see FIG. 6.

After each section of the product is thus severed or separated below the tensioning rollers 34, the longitudinal stretch in the two steel sheets 10 caused by the action of the rolls 13 and 34 is released and this released energy causes longitudinal compression of the severed section 47. The end plates 43 of the severed section 47 are actually pulled toward each other to compress the solidified foam glass core 31 therebetween. Thus, the composite panel section 47 becomes mechanically prestressed externally by the described means.

Additionally, since the sheet steel facings 10 have a much higher coefficient of expansion than the foam glass core 31, and are bonded to the core, as the steel sheets and glass core cool, the sheets will contract to a much greater extent than the glass core and bring the glass under further compression both longitudinally and laterally, or widthwise, of the product. The width of the product is its dimension axially of the rolls 34 as depicted in FIG. 4.

The concept of externally prestressing the vacuum foam glass core or slab 31 as the basis of strength includes ideally compressing the core on all dimensional axes, namely, lengthwise, widthwise and on the thickness axis which is the product dimension shown in FIGS. 2, 5 and 6. The sheet steel facings accomplish the compression along the length and width axes, as described, and atmospheric pressure normal to the two main facings 10 accomplishes the compression of the core on the third dimensional axis or thickness axis. Since the pressure of the atmosphere is directly proportional to the surface area against which it is acting, this pressure will have little compressional effect on the narrow edges of the product but will have a relatively great compressional effect on the thickness axis or normal to the large area sheets 10, and thus the composite product unit 47 is externally prestresssed on its three dimensional axes which is ideal in achieving maximum strength as for a structural panel which is essentially lightweight, exteriorly finished, sealed and resistant to corrosion.

Additional advantages of the product not already mentioned herein include the fact that it has a watertight skin and due to its high strength can be stacked flat and shipped much more economically and over longer distances than prestressed concrete.

The vacuum foam glass will also provide extremely good thermal and sound insulation, considerably superior to regular foam glass produced without the vacuum environment.

Producing the product under vacuum and sealing the glass from the atmosphere will additionally increase its strength by excluding oxygen from the surfaces and thus reducing surface flaws which in turn eliminates stress concentrations.

Referring to FIG. 7 of the drawings, a modification of the invention is shown in which the external prestressing and protective steel sheets of the previous embodiment are entirely eliminated. Instead, the strength of the foam glass product is based entirely on atmospheric compression.

Atmospheric compression is assumed to be proportional to surface areas and at right angles to planes of surfaces effected. Therefore, to greatly increase the total surface area exposed to the atmosphere on one side of the product, voids or recesses are formed in the product on such side. This greatly increases the total surface area exposed to atmosphere in the thickness direction or on the thickness axis. In the case of a structural floor slab, therefore, the resulting atmospheric compression would greatly strengthen the slab and increase its load bearing capacity. In other words, the atmosphere would exert increased longitudinal and lateral compression on the recessed side of the product or panel due to increased surface area.

Referring to FIG. 7, a molten glass furnace 48 connected with a pressure or vacuum control pump 49 delivers molten glass into a vacuum chamber 50 through a decompression gas-releasing and foaming nozzle means 51. A vacuum pump 52, or a series of pumps, maintains a high degree of vacuum in the chamber 50. Auxiliary vacuum pumps 53 maintain the same vacuum in auxiliary chambers 54 bounded by slit vacuum seals 55 within a depending relatively thin vaccum housing extension 56. Softer molten foam glass 57 from the furnace 48 and nozzle 51 enters the top of the vacuum chamber 50 to produce a slab-like mass. This mass is developed between a pair of powered endless belts, one of which designated by the numeral 58 is a thin sheet metal smooth non-sticking belt, preferably gold or platinum alloy plated. An opposing simultaneously driven endless belt 59 with spaced male product recessing forms 60 thereon which may be cylindrical continuously produces multiple spaced voids or recesses 61 over the entire adjacent face of the product. A cooling coil 62 in the chamber 50 solidifies the foam glass slab as the recesses 61 are formed in it by the belt 59 and such recesses will be permanent in the solidified product 63 as it emerges from between the two forming belts.

Instead of the previously-described molten metal seals 14 and 21, FIG. 1, the vacuum is maintained in the apparatus housing, FIG. 7, by forcing the product 63 to move downwardly through the slit seals 55, with progressive pressure differentials maintained between the seals by the auxiliary pumps 53. The individual seals 55 are sufficiently wide to span the moving recesses 61 of the product and gases in the vacuum chamber are trapped in these recesses and conveyed out of the vacuum chamber with the recessed panel structure or slab under the driving influence of suitable rolls 64. This, in effect, causes the recessed product to serve as a sort of vacuum pump to help maintain adequate vacuum in the apparatus chamber by continuously carrying away gas trapped in the multiple recesses 61. The finished solidified product beyond the rolls 64 is cut or divided into useful panel lengths.

Thus, in the modified form of the invention, a vacuum foam glass structural panel is provided and this panel is prestressed solely by the compressive action of the atmosphere acting on the increased area at one major side thereof formed by the recesses 61.

Figure 8:
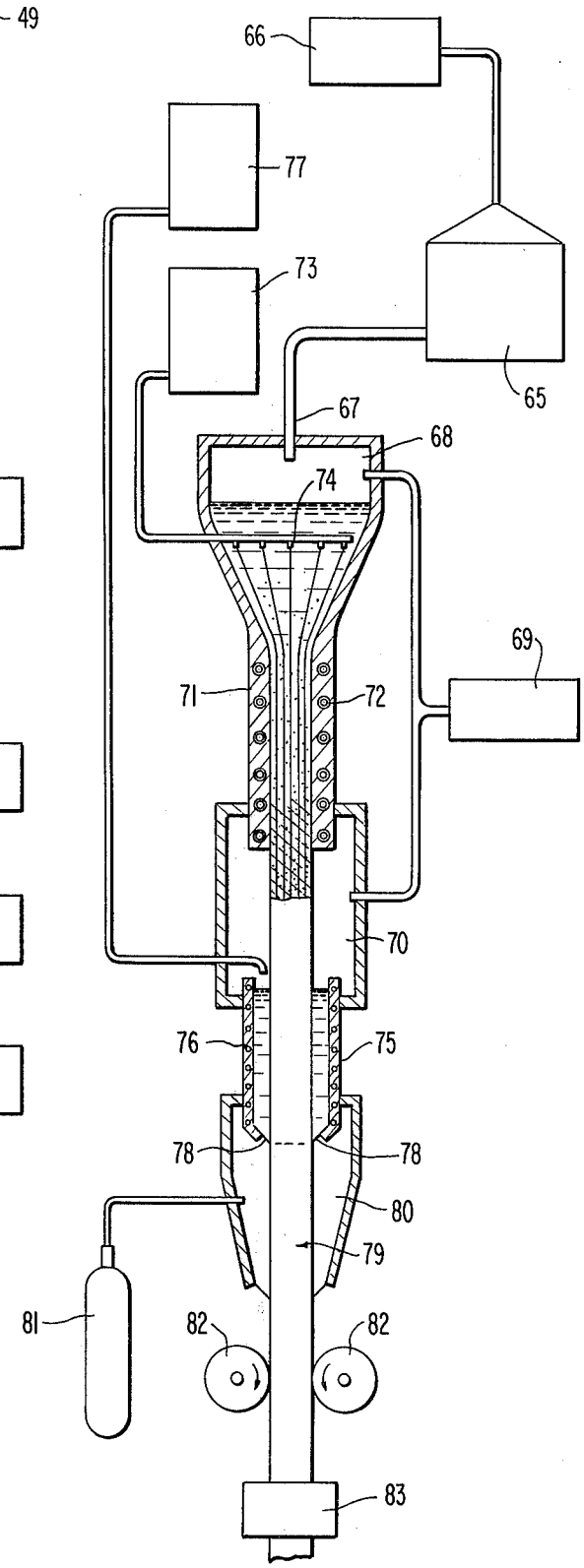
FIG. 8 is a similar schematic view of a plant and product according to another modification of the invention.

A second modification of the invention shown particularly in FIG. 8 amounts to a compromise between the metal cladded externally mechanically prestressed product 47 and the uncovered atmospherically prestressed product 63 in the second form. Referring to FIG. 8, molten glass is again delivered from a furnace 65 having a pressure or vacuum control means 66, or pump, through a decompression nozzle 67 into a vacuum chamber 68 in which adequate vacuum is maintained by a suitable pump 69, or series of pumps. The vacuum chamber includes a lower section 70 separated from the upper section 68 by a contiguous non-sticking casting form 71, or mold, preferably gold plated and containing a product cooling coil 72.

An optional feature of this second modification is to install a second molten aluminum furnace 73 to deliver molten aluminum to a die grid 74 for extrusion of a multiple of molten aluminum film sheets into the foam glass product in the region where it is changing from a soft to a solid product adjacent the elements 71 and 72. This, in effect, creates layers of vacuum foam glass separated by film sheets of aluminum. These aluminum film sheets should chemically bond to the vacuum foam glass. The purpose of these aluminum film sheets is to prevent crack propagation from one layer of vacuum foam glass to another layer, thereby increasing structural reliability of the panel.

A molten aluminum vacuum seal and coater 75 with heating coil 76 is supplied with molten aluminum from an aluminum melt furnace 77. Spring-tensioned scraper blades 78 at the bottom of seal 75 regulate the thickness and evenness of the aluminum coating which is continuously cast onto the foam glass product 79 in this modification of the invention.

An anti-oxidizer chamber 80 immediately below the seal 75 receives helium gas, or equivalent gas, from an external pressurized source 81. Powered pull-down rolls 82 continuously advance the solidified foam glass slab and its external aluminum cast-on coating to a suitable cut-off means 83 below the rolls 82, which means cuts the product into usable panel lengths.

Thus, the product 79 resembles the product 47 in that it has an external skin of metal, but this skin is of cast or dipped formation on the product rather than an applied separately fabricated skin or cladding of steel.

To the extent that the product 79 is prestressed, this will be due only to the difference in coefficients of thermal expansion of the aluminum skin and the foam glass core, and with no mechanical prestressing as afforded by the sheets 10 in the preferred embodiment. The cast-on aluminum coating or skin of the product 79 will have considerably less strength than the skin of rolled sheet steel on the product 47. Nevertheless, the product 79 is quite strong with a good strength-to-weight factor and is sealed aainst the entry of water and is also corrosion-resistant.

In FIG. 8, the continuous casting mold 71 must allow the molten and solidified foam glass slab to slide freely and therefore the mold must utilize a release agent or have a contact face which will not adhere to glass, such as a gold or platinum plated face.

It is to be undestood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A method of continouously casting a structural load bearing member comprising feeding molten glass foam downwardly from a source on a substantially vertical path within a vacuum chamber where a substantially constant vacuum is maintained, simultaneously feeding molten metal coated pretensioned metal sheets downwardly on said vertical path in said vacuum chamber with said coated metal sheets in contact with the molten glass foam to form bonded prestressed skins on said structural load bearing member, and cooling the resulting composite product to solidify the molten glass foam.

2. The method as defined in claim 1, and said metal sheets comprising steel sheets and the metal coating on said sheets comprising aluminum.

3. The method as defined in claim 1, wherein said structural load bearing member is cast in substantially rectangular slab form with said bonded prestressed skins covering the major opposite faces thereof.

4. The method as defined in claim 3, and the additional step of applying metal end facings to section of the product by forcing the end facings through the glass foam and joining them to said prestressed skins while the latter are held under tension.

5. The method as defined in claim 1, and the additional step of severing the product into usable slab lengths exteriorly of said vacuum chamber.

6. The product resulting from the method in claim 1.

* * * * *